Dec. 7, 1937.　　　L. J. P. MAAS　　　2,101,621
DOUGH MOLDING MACHINE
Filed Jan. 22, 1937　　3 Sheets—Sheet 1

Dec. 7, 1937.  L. J. P. MAAS  2,101,621
DOUGH MOLDING MACHINE
Filed Jan. 22, 1937  3 Sheets-Sheet 2
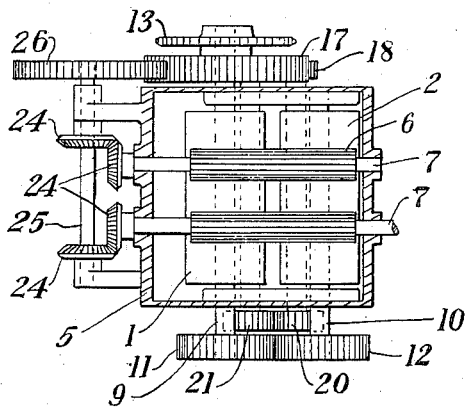
Fig. 2.
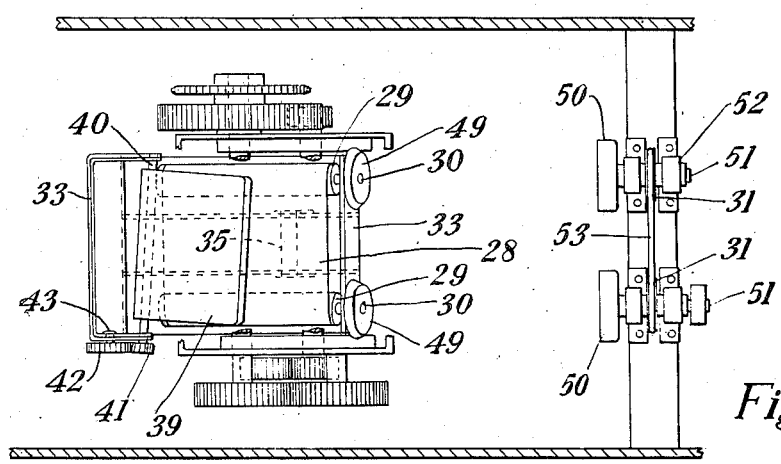
Fig. 3.
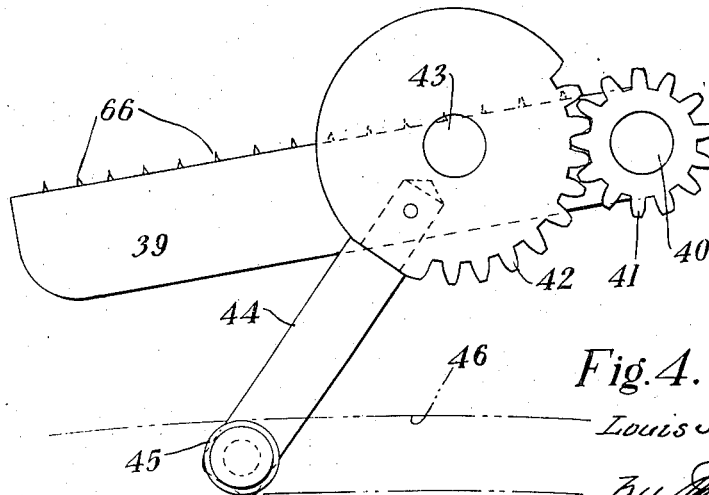
Fig. 4.   Inventor
Louis J. P. Maas
By [signature]
Atty.

Dec. 7, 1937.  L. J. P. MAAS  2,101,621
DOUGH MOLDING MACHINE
Filed Jan. 22, 1937  3 Sheets—Sheet 3

Inventor
Louis J. P. Maas
By  
Atty

Patented Dec. 7, 1937

2,101,621

UNITED STATES PATENT OFFICE 2,101,621

DOUGH MOLDING MACHINE

Louis Jacob Philipp Maas, London, England

Application January 22, 1937, Serial No. 121,873
In Great Britain January 24, 1936

5 Claims. (Cl. 107—9)

The invention relates to machines for molding pieces of dough preparatory to baking into loaves or rolls.

Dough molding machines have been proposed hitherto in which each piece of dough is first flattened by rollers and deposited on a conveyer band, then has two opposing edges turned in, and is next, sometimes after a further flattening, rolled up under slight pressure.

Hitherto the turning in of the edges of the preliminary flattened piece has been effected by conical or inclined cylindrical rollers arranged over the conveyer so that as the piece is conveyed past them, the rollers engage with the edges of the piece and work or push in and over the dough at the edges. Moreover, the piece—sometimes after further flattening—is rolled up with the turned in edges at the sides of the roll.

The action of rollers on the dough as hitherto suggested for working over the edges is apt to punish the dough unduly and the object of the invention is to avoid this by folding the dough by means which gently treat it.

A dough molding machine according to the invention comprises means for feeding a flattened piece of dough, a table or carrier and means for effecting a relative reciprocating motion between the feeding means and the carrier while the dough is being laid on the carrier so that the dough is folded on itself, and a flap on which a portion of the dough is deposited, movement of the flap causing the dough thereon to be folded onto the dough on the carrier.

The feeding means may include brake rolls so that the usual piece of dough for example from a dough divider is fed in a flattened form. The feeding apparatus may be in a fixed position and the carrier may be reciprocated or oscillated below it so as to receive the flattened piece of dough which, as it engages with the carrier, is laid thereon and folded over on itself.

The carrier effects the folding of the piece of dough partly by its reciprocations, and partly by means of a flap onto which part of the piece of dough is laid and is folded over by the flap which is moved over for this purpose.

The carrier is preferably adapted to deliver the folded piece which can then, or after further flattening between rolls, be rolled up by hand or by a suitable rolling-up device to complete the molding operation.

In the accompanying drawings:

Figure 2 is a plan of the feeding mechanism.

Figure 3 is a sectional plan on III—III, Figure 1.

Figure 4 is a side view of the flap and its gear wheels.

Figure 1:
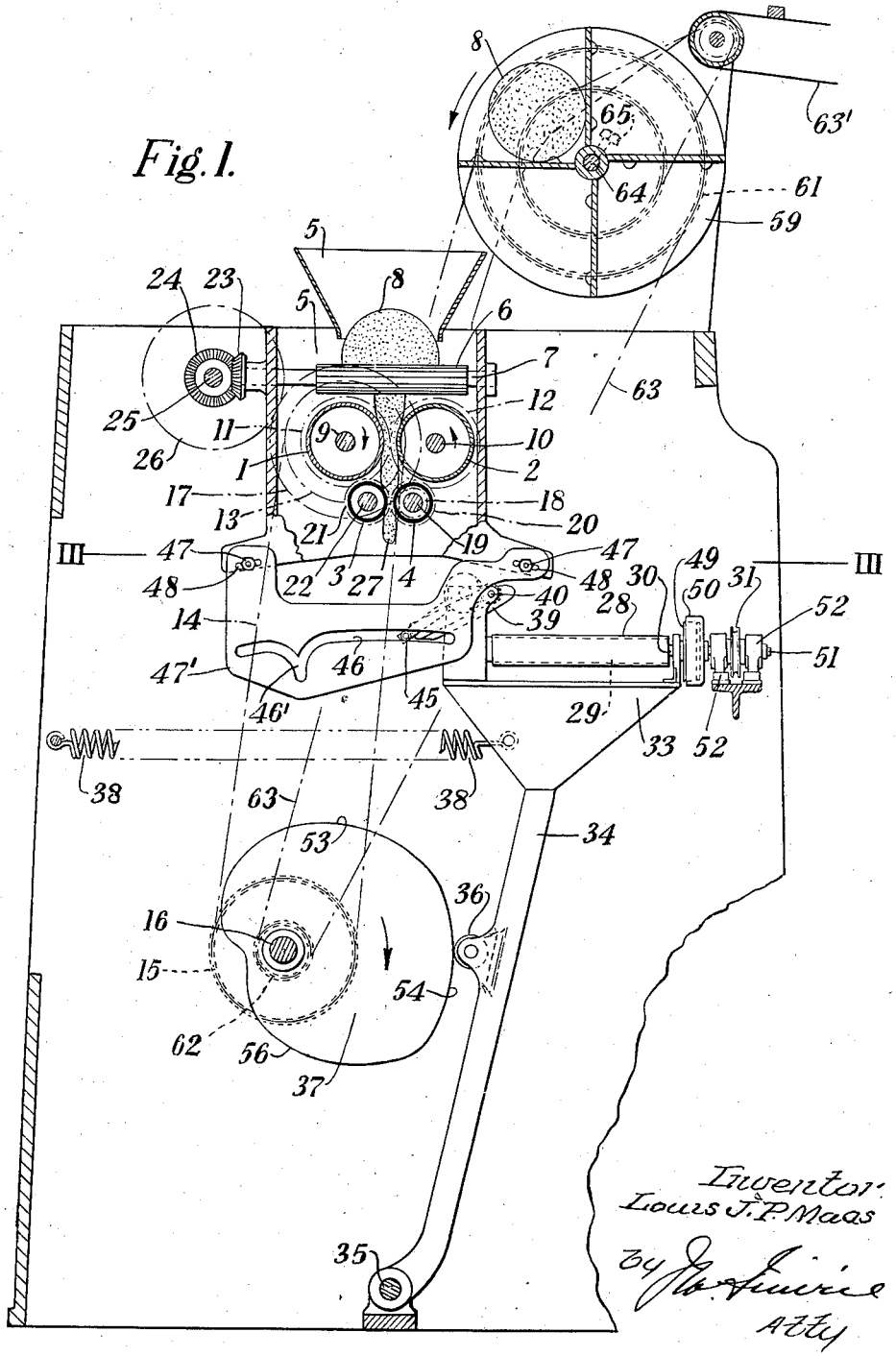
Figure 1 is a side elevation of the machine partly in section.
Figure 5:
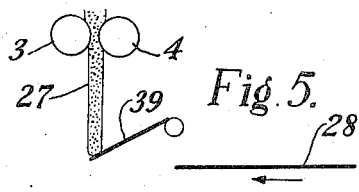
Figures 5 to 10 are diagrams illustrating the sequence of operations in the folding of a piece of dough.

In the machine illustrated by Figures 1 to 10, two pairs of brake rolls 1, 2 and 3, 4 are inserted in a hopper 5. Two spaced fluted or serrated feed rollers 6, 6 may be mounted in the hopper above the brake rolls so as to ensure that a piece or clot of dough 8 shall be fed to and be gripped by the brake rolls 1 and 2.

The brake rolls 1 and 2 are mounted on shafts 9 and 10 provided with intermeshing toothed wheels 11 and 12 of equal size. The shaft 9 has a sprocket 13 driven by a chain 14 from a sprocket 15 on a shaft 16. The shaft 9 also carries a toothed wheel 17 meshing with a small toothed wheel 18 on the shaft 19 of the brake roll 4. A toothed wheel 20 on the shaft 19 meshes with a toothed wheel 21 of equal size on the spindle 22 of the brake roll 3.

The shafts 7, 7, of the feed rolls 6, 6 have toothed bevel wheels 23 meshing with toothed bevel wheels 24 on a shaft 25 which has a toothed wheel 26 meshing with the toothed wheel 17.

As a piece or clot of dough 8 passes through the brake rolls 1, 2, 3, 4, it hangs in a flattened form as indicated at 27 and engages with a reciprocatory or oscillatory carrier 28 which is shown in the form of an endless band 28 stretched between two rollers 29, 29, the shafts 30, 30 of which are mounted in a frame 33 which is carried by a lever 34. The lever 34 is mounted on a pin 35 and has a roller 36 engaging with a cam 37 which is mounted on the shaft 16. A spring 38 holds the lever 34 with its roller 36 in engagement with the cam.

A wooden or other flap 39 is carried by a shaft 40 which is mounted on the frame 33. The shaft 40 has a toothed wheel 41 meshing with a toothed wheel 42 free to rotate on a stud 43 which is mounted on the frame 33. The wheel 42 has a lever 44 which carries at its end a roller 45 running in a cam track or slot 46 in a plate 47' which is secured to the main frame of the machine, preferably adjustably, as by bolts 47, 47 passing through slots 48, 48.

The shafts 30, 30 have clutch members 49, 49, for intermittent engagement with corresponding clutch members 50, 50, which are mounted on spindles 51, 51, carried in bearings 52, 52 fixed to the main frame of the machine. The spindles 51, 51 carry pulleys 31, 31 for a driving belt or cord 53 which may be driven from any suitable source of power.

The cam 37 has a concentric portion or dwell, as indicated at 54 in Figure 1, so that while this portion is passing the roller 36, the lever 34 holds the carrier frame 33 in its extreme position to the right with the clutch members 49, 50 in engagement so that the shafts 30, 30 and the rollers 29, 29 are rotated to cause the endless carrier 28 to travel and thereby to deliver the folded piece of dough for the purpose hereinafter referred to.

The remainder of the cam 37 is so shaped that, during its rotation, the carrier frame 33 is reciprocated, one part 55 corresponding to the movement of the carrier frame 33 to the left and another part 56 corresponding to the movement to the right.

Figure 6:
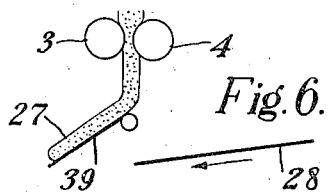

When the carrier frame 33 is moving to the left (Figures 1 and 5), the flattened piece of dough 27 depending from the brake rolls 3, 4 first engages with the flap 39 and as this moves onwards, the piece 27 is laid on the flap 39 and then on the carrier 28 (Figure 6).

Figure 7:
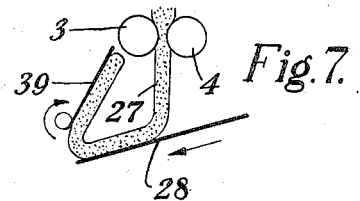
Figure 8:
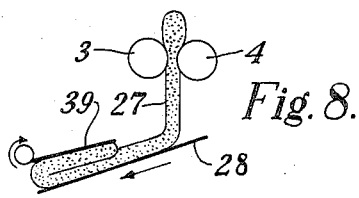

As the carrier frame 33 approaches the end of its movement to the left, the roller 45 leaves the straight portion of the cam track 46 and enters the peculiarly shaped portion 46' at the left hand end so that the lever 44 is oscillated and through the toothed wheels 42 and 41 partly rotates the shaft 40 of the flap 39, causing the flap to swing over and fold the portion of dough which is on it on top of the adjacent portion of dough on the carrier 28 (Figures 7 and 8).

Figure 9:
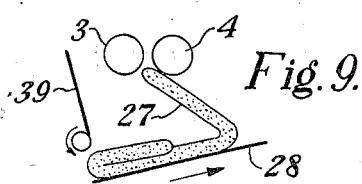
Figure 10:
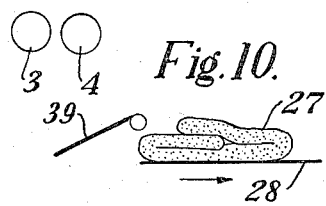

On the next movement of the carrier frame 33 to the right, the roller 45 passes into the part 46' of the cam slot 46 whereby the flap 39 is moved to its original extended position. The remainder of the flattened piece of dough 27 still issuing from the brake rolls 3 and 4 is folded or laid on that portion of the dough on the carrier 28 which is not covered by the portion which was folded over by the flap 39 (Figure 9). It is preferred to insert a clot or piece of dough 8 of sufficient size or weight into the machine to ensure that the flattened piece 27 delivered by the brake rolls 3 and 4 shall be long enough for the final or tail end portion as it falls from the brake rolls 3 and 4 to overlap slightly the portion which has been folded over by the flap 39 (Figure 10). The portion 46' of the cam track 46 is so shaped that the flap 39 is inclined below the horizontal and this slightly compresses the piece of dough folded by it and presses together the two layers of dough so as to compensate for the overlapping tail end portion folded over onto it. The surface of the flap 39 may be of such a nature that the dough will adhere to it whilst it is passing beneath the rollers 3 and 4, and so that the dough will not fall from it in an uncontrolled manner while the flap is being rocked to fold the dough. For example, spikes 66 may be provided projecting from the flap.

The folded piece of dough on the endless carrier 28 is then carried to the right (Figure 10) until the clutch members 49, 50 are in engagement, whereupon the endless carrier 28, which has hitherto been stationary on its rollers 29, 30, is operated to deliver the folded piece of dough.

The delivered folded piece of dough may be conveyed by suitable means to a pair of rolls by which it may be further flattened and then be fed to a suitable rolling machine by which it is rolled up, or it may be rolled up by hand, in a direction at right angles to the folded edges.

In order that pieces of dough 8 may be fed into the hopper synchronously with the reciprocation of the carrier 28, a conveyer may be provided. As shown, a pocket wheel 59 is mounted on a shaft 64 above, and to one side of, the hopper 5 and is driven continuously from the cam shaft 16 by means of sprocket wheels 61 and 62 and a chain 63, the ratio of the sprocket wheels being such that the pocket wheel rotates one quarter of a revolution during each rotation of the cam shaft and, therefore, during each complete oscillation of the carrier 28. The pocket wheel is fed by a belt conveyer 63, and as each pocket can accommodate but one piece of dough 8, the feeding of a dough piece into the hopper at such a time that it will be received correctly by the flap 39 is ensured. The pocket wheel 59 is secured to its shaft 64 by a set-screw 65, so that it may be angularly adjusted and thereby afford a method of correctly synchronizing the feeding of the dough piece to the hopper and the movements of the carrier.

The machine according to the invention has the advantage that it enables a flattened piece of dough, which is long in relation to its width, to be folded over at its narrow sides and that these folded parts may overlap. When a piece of this form is so molded and is ultimately rolled up in a direction at right angles to the folds, it results, when baked, in a long loaf of proper proportions and shape, unlike the loaf produced by the piece worked over at its longer sides by rollers in machines hitherto proposed.

The overlapping of the folded parts is desirable as it avoids any tendency for the loaf assuming a dumb-bell shape.

I claim:

1. A dough molding machine comprising a carrier having a flap, means for feeding a flattened piece of dough onto said flap and carrier, means for oscillating said flap relatively to said carrier for the purpose of folding the dough fed to it and the carrier, and means for reciprocating said carrier relatively to said feeding means for the purpose hereinbefore set forth.

2. A dough molding machine comprising a carrier, a flap hinged relatively to said carrier, means for feeding a flattened piece of dough onto said flap and carrier, a toothed wheel on the hinge pin of said flap, a second toothed wheel meshing therewith and having a lever provided with a roller, a fixed cam track for said roller, and means for reciprocating said carrier and flap relatively to said feeding means and to said cam track, substantially as and for the purposes hereinbefore set forth.

3. A dough molding machine comprising a carrier in the form of an endless band, rollers for said band, a frame supporting said rollers, clutch members on the axes of said rollers, corresponding driving clutch members, means for rotating said driving members, means for feeding a flattened piece of dough to said carrier, means for reciprocating said carrier relatively to said feeding means for the purpose of folding the dough fed to it and also for bringing said clutch members into engagement for the operation of said band to discharge the folded dough.

4. A dough molding machine comprising rollers for feeding a flattened piece of dough, a carrier comprising an endless band mounted on rollers, means for effecting a relatively reciprocatory motion between said rollers and said carrier, in order that dough received on the carrier may be folded upon itself, and a flap mounted in hinged relation relatively to said carrier and adapted to receive a part of the dough from said rollers and means for oscillating said flap to fold the dough thereon onto the dough on the carrier.

5. A dough molding machine comprising means for feeding a flattened piece of dough onto a carrier, means for effecting a relative reciprocating motion between the carrier and feeding means in order that a portion of the dough piece may be laid on the carrier and folded on itself, and a flap mounted in pivotal relation to said carrier and adapted to receive a portion of the dough piece and means for effecting a relative movement of said flap and carrier in order that the portions of dough on the flap and carrier may be folded together.

LOUIS JACOB PHILIPP MAAS.